T. C. CLARKE.
Improvement in Wrought-Iron Columns.
No. 131,502.
Patented Sep. 24, 1872.
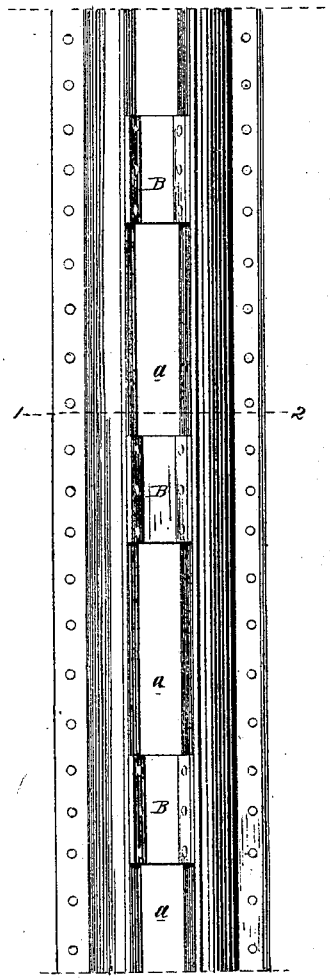
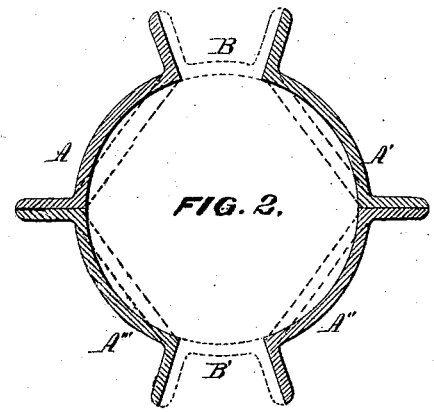
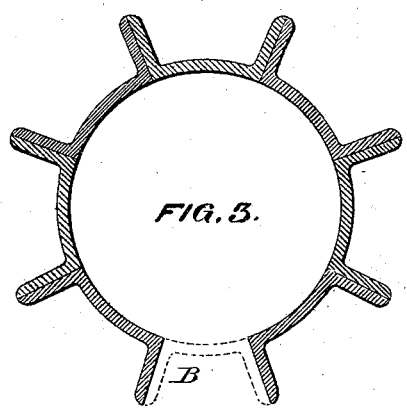
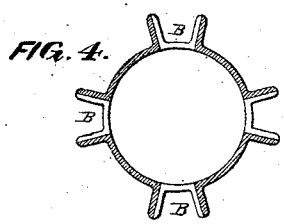 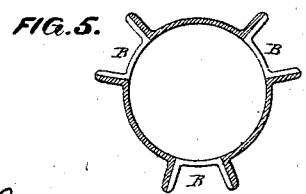

UNITED STATES PATENT OFFICE.

THOMAS C. CLARKE, OF PHILADELPHIA, PENNSYLVANIA, ASSIGNOR TO CLARKE, REEVES & COMPANY, OF SAME PLACE.

IMPROVEMENT IN WROUGHT-IRON COLUMNS.

Specification forming part of Letters Patent No. 131,502, dated September 24, 1872.

*To all whom it may concern:*

Be it known that I, THOMAS CURTIS CLARKE, of Philadelphia, Pennsylvania, have invented an Improvement in Wrought-Iron Columns, of which the following is a specification:

My invention relates to an improvement in the wrought-iron column for which Letters Patent were granted to S. J. Reeves, June 17, 1862; and my improved column consists of main flanged bars of rolled iron and short flanged bars, the latter being arranged at intervals, all substantially as described hereafter, so as to leave in the column a series of openings through which the interior can be inspected and painted after the column has been erected, and so as to afford conveniences for the connecting of beams and other attachments to the column.

In the accompanying drawing, Figure 1 is a side view of a portion of my improved wrought-iron column; Fig. 2, a transverse section on the line 1 2; and Figs. 3, 4, and 5, transverse sections illustrating modifications of my invention.

My improved column is constructed on the same principle as that for which Letters Patent were granted to S. J. Reeves, June 17, 1862. The Reeves column, however, as now constructed, consists of a number of flanged bars continued from end to end, so that no access can be had to the interior of the column excepting through the ends, and consequently there is no means of painting the interior after the column becomes part of a bridge or other structure, a defect which I remedy by the invention which I will now proceed to describe.

In Figs. 1 and 2 the column is composed of four flanged bars, A, A', A'', and A''', and the two sets of narrower and shorter flanged bars, B and B', the former extending from end to end of the column, and the latter occurring at intervals, as shown in Fig. 2, thereby leaving in the column two opposite rows of elongated openings, *a*, which occur at intervals throughout the column, and through which the interior of the column can be readily painted and inspected. The several flanged bars are riveted or bolted together, as in the Reeves column, and in a manner which will be readily understood, without further description, by referring to the drawing. The openings *a* may be of just sufficient width to permit the painting the interior of the column, and the bars B B' should be of sufficient length, and should occur at such intervals that the integrity of the column as a unit of strength will be preserved.

The advantage of my improved column is not limited to the facility which is afforded for the inspection and painting of the interior, for the openings afford opportunities for making attachments to the column in bridge and other structures. The ends of floor-beams, for instance, may be introduced into the openings and bear on the upper edges of the short intermediate bars B and B'.

In the modification shown in Fig. 3 there is but one row of elongated openings and one set of short flanged bars, B, occurring at intervals. This modification may be advantageously applied to the horizontal compression-chords of truss-frame bridges, in which it is desirable that as much of the tube as possible should be closed to prevent the access of moisture to the interior; hence the one row of openings is arranged beneath, and these openings are of sufficient area to permit the painting of the interior.

For the posts of truss-frame bridges, and for the columns of buildings, I prefer the plan illustrated in Figs. 1 and 2, in which there are two rows of openings directly opposite to each other. A column, however, may consist of four main flanged bars extending from end to end, and four sets of short bars, as shown in Fig. 4, thus leaving four rows of openings; or the column may consist of three main bars and three sets of short bars, as in Fig. 5; in fact, the number of main bars and the number of sets of intermediate short bars will, in a great measure, depend upon the character of the structure to which the column has to be applied. In most cases, however, the column Fig. 2 will be most appropriate. The bars may be of the curved sectional form shown, or straight, as shown by dotted lines.

I claim as my invention—

As an improvement on the aforesaid patent of S. J. Reeves, the within-described column, composed of long and short flanged bars, as set forth.

In testimony whereof I have signed my name to this specification in the presence of two subscribing witnesses.

THOMAS C. CLARKE.

Witnesses:
 WM. A. STEEL,
 JOHN K. RUPERTUS.